(12) United States Patent (10) Patent No.: US 12,614,730 B2
Goliaszweski et al. (45) Date of Patent: Apr. 28, 2026

(54) AQUEOUS BINDER COMPOSITION FOR AN ELECTRODE AND METHODS FOR PRODUCING THE SAME

(71) Applicant: HERCULES LLC, Wilmington, DE (US)

(72) Inventors: Alan Edward Goliaszweski, Hockessin, DE (US); Shufu Peng, Hockessin, DE (US)

(73) Assignee: HERCULES LLC, Wilmington, DE (US)

( * ) Notice: Subject to any disclaimer, the term of this patent is extended or adjusted under 35 U.S.C. 154(b) by 799 days.

(21) Appl. No.: 17/285,817

(22) PCT Filed: Oct. 16, 2019

(86) PCT No.: PCT/US2019/056460
§ 371 (c)(1),
(2) Date: Apr. 15, 2021

(87) PCT Pub. No.: WO2020/081639
PCT Pub. Date: Apr. 23, 2020

(65) Prior Publication Data
US 2021/0384511 A1 Dec. 9, 2021

Related U.S. Application Data

(60) Provisional application No. 62/746,440, filed on Oct. 16, 2018.

(51) Int. Cl.
| | |
|---|---|
| *H01M 4/62* | (2006.01) |
| *H01M 4/04* | (2006.01) |
| *H01M 4/38* | (2006.01) |
| *H01M 4/587* | (2010.01) |
| *H01M 10/0525* | (2010.01) |

(52) U.S. Cl.
CPC ......... *H01M 4/622* (2013.01); *H01M 4/0404* (2013.01); *H01M 4/0416* (2013.01); *H01M 4/386* (2013.01); *H01M 4/387* (2013.01); *H01M 4/587* (2013.01); *H01M 4/625* (2013.01); *H01M 10/0525* (2013.01)

(58) Field of Classification Search
None
See application file for complete search history.

(56) References Cited

U.S. PATENT DOCUMENTS

| | | | |
|---|---|---|---|
| 2004/0062989 A1 | 4/2004 | Ueno et al. | |
| 2010/0075222 A1* | 3/2010 | Watanabe ........... | H01M 10/052 252/521.2 |
| 2012/0321963 A1 | 12/2012 | Fujioka et al. | |
| 2014/0106218 A1* | 4/2014 | Lee ........................ | C08F 220/34 526/240 |
| 2015/0132644 A1* | 5/2015 | Sonobe ................. | H01M 4/134 252/511 |
| 2016/0126535 A1 | 5/2016 | Qiao et al. | |
| 2018/0019457 A1 | 1/2018 | Alharizah et al. | |

FOREIGN PATENT DOCUMENTS

| | | |
|---|---|---|
| CN | 103724523 A | 4/2014 |
| CN | 105246998 A | 1/2016 |
| CN | 105378989 A | 3/2016 |
| CN | 107810172 B | 9/2021 |
| JP | H0982363 A | 3/1997 |
| JP | 2006-278303 A2 | 10/2006 |
| JP | 2014-077134 A2 | 5/2014 |
| KR | 10-2012-0028339 A | 3/2012 |
| KR | 10-2014-0046987 A | 4/2014 |
| WO | WO2011002016 A1 | 1/2011 |
| WO | WO2016163114 A1 | 10/2016 |

OTHER PUBLICATIONS

References cited in the International Search Report of International Application No. PCT/US19/056460.

* cited by examiner

*Primary Examiner* — Zhongqing Wei
(74) *Attorney, Agent, or Firm* — Aseem V. Mehta; Nathalie Tietcheu

(57) ABSTRACT

An aqueous binder composition comprising a cationic copolymer derived from at least one cationic monomer and at least one nonionic monomer is disclosed. Additionally, the present disclosure relates generally to electrode compositions and methods of making electrodes, especially anodes, with the binder composition.

17 Claims, No Drawings

AQUEOUS BINDER COMPOSITION FOR AN ELECTRODE AND METHODS FOR PRODUCING THE SAME

FIELD OF THE INVENTION

The presently disclosed and/or claimed inventive process(es), procedure(s), method(s), product(s), result(s), and/or concept(s) (collectively hereinafter referred to as the "present disclosure") relates generally to an aqueous binder composition for use in battery electrodes and methods of preparing such. More particularly, but not by way of limitation, the present disclosure relates to an aqueous binder composition comprising a cationic copolymer derived from at least one cationic monomer and at least one nonionic monomer. Additionally, the present disclosure relates generally to electrode compositions and methods of making electrodes, especially anodes, with the aqueous binder composition.

BACKGROUND OF THE INVENTION

Lithium ion batteries (LIB's) are used in an array of products including medical devices, electric cars, airplanes, and most notably, consumer products such as laptop computers, cell phones, and cameras. Due to their high energy densities, high operating voltages, and low self-discharges, lithium ion batteries have overtaken the secondary battery market and continue to find new uses in developing industries and products.

Generally, lithium ion batteries comprise an anode, a cathode, and an electrolyte material such as an organic solvent containing a lithium salt. More specifically, the anode and cathode (collectively, "electrodes") are formed by mixing either an anode active material or a cathode active material with a binder and a solvent to form a paste or slurry which is then coated and dried on a current collector, such as aluminum or copper, to form a film on the current collector. The anodes and cathodes are then layered and coiled prior to being housed in a pressurized casing containing an electrolyte material, which all together forms a lithium ion battery.

When making electrodes, it is important to select a binder with sufficient adhesive and chemical properties such that the film coated on the current collector will maintain contact with the current collector even when manipulated to fit into the pressurized battery casing. Since the film contains the electrode active material, there will likely be significant interference with the electrochemical properties of the battery if the film does not maintain sufficient contact with the current collector. As such, the binder plays a key role in the performance of lithium ion batteries. The existing binder such as styrene butadiene rubber/carboxymethyl cellulose has very low adhesion with respect to the active material. As the uses of the lithium ion battery are changed from small electronic devices to large ones such as electric automobiles and power storages, there is a need for negative electrode materials such as silicon and its related materials, which have better performance including high safety, extended cycle life, high energy density and high power. The existing binders cannot meet the requirements. Therefore, there is a need to develop a new aqueous binder composition to meet these requirements.

DETAILED DESCRIPTION OF THE INVENTIVE CONCEPT(S)

Before explaining at least one embodiment of the present disclosure in detail, it is to be understood that the present disclosure is not limited in its application to the details of construction and the arrangement of the components or steps or methodologies set forth in the following description or illustrated in the drawings. The present disclosure is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the present disclosure shall have the meanings that are commonly understood by those of ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference.

All of the articles and/or methods disclosed herein can be made and executed without undue experimentation in light of the present disclosure. While the articles and methods of the present disclosure have been described in terms of preferred embodiments, it will be apparent to those of ordinary skill in the art that variations can be applied to the articles and/or methods and in the steps or in the sequence of steps of the method described herein without departing from the concept, spirit and scope of the present disclosure. All such similar substitutes and modifications apparent to those skilled in the art are deemed to be within the spirit, scope and concept of the present disclosure.

As utilized in accordance with the present disclosure, the following terms, unless otherwise indicated, shall be understood to have the following meanings.

The use of the word "a" or "an" when used in conjunction with the term "comprising" can mean "one," but it is also consistent with the meaning of "one or more," "at least one," and "one or more than one." The use of the term "or" is used to mean "and/or" unless explicitly indicated to refer to alternatives only if the alternatives are mutually exclusive, although the disclosure supports a definition that refers to only alternatives and "and/or." Throughout this application, the term "about" is used to indicate that a value includes the inherent variation of error for the quantifying device, the method being employed to determine the value, or the variation that exists among the study subjects. For example, but not by way of limitation, when the term "about" is utilized, the designated value can vary by plus or minus twelve percent, or eleven percent, or ten percent, or nine percent, or eight percent, or seven percent, or six percent, or five percent, or four percent, or three percent, or two percent, or one percent. The use of the term "at least one" will be understood to include one as well as any quantity more than one, including but not limited to, 1, 2, 3, 4, 5, 10, 15, 20, 30, 40, 50, 100, etc. The term "at least one" can extend up to 100 or 1000 or more depending on the term to which it is attached. In addition, the quantities of 100/1000 are not to be considered limiting as lower or higher limits can also produce satisfactory results. In addition, the use of the term "at least one of X, Y, and Z" will be understood to include X alone, Y alone, and Z alone, as well as any combination of X, Y, and Z. The use of ordinal number terminology (i.e., "first", "second", "third", "fourth", etc.) is solely for the purpose of differentiating between two or more items and, unless otherwise stated, is not meant to imply any sequence or order or importance to one item over another or any order of addition.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The term "or combinations thereof" as used herein refers to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

As used herein, the term "copolymer" refers to polymers formed by the polymerization reaction of at least two different monomers.

As used herein, the term "copolymerization" includes all types of copolymerization such as random, graft, block, etc. In general, the copolymers, used in accordance with the present disclosure, can be prepared in accordance with any suitable catalytic copolymerization process, including solution copolymerization, slurry copolymerization, gas phase copolymerization, and high-pressure copolymerization processes.

As Used herein the phrase "aqueous" or "aqueous solvent" includes water and mixtures comprising water and one or more water-miscible solvent.

The present disclosure encompasses an aqueous binder composition for production of lithium ion battery electrodes. In particular, the binder composition comprises a cationic copolymer, which can be derived from at least one cationic monomer selected from the group consisting of acrylamidopropyltrimethylammonium chloride (APTAC), methacrylamidopropyltrimethylammonium chloride (MAPTAC), acryloyloxyethyltrimethylammonium chloride (AETAC), methacryloyloxyethyltrimethylammonium chloride (MAETAC), N-[2-(acryloyloxy)ethyl]-N-benzyldimethylammonium chloride, acryloyloxyethyltrimethyl ammonium chloride and 3-(methacryloylamino)propyl-lauryl-dimethylammonium chloride (MAPLDMAC); and at least one non-ionic monomer selected from the group consisting of acrylamide (AM), dimethylacrylamide, diethylacrylamide, hydroxyethyl acrylamide, dimethylaminopropyl acrylamide, dimethylaminopropyl methacrylamide, vinyl acetate (VA), vinylformamide, acrylonitrile (AN), acrylate, ethylhexyl acrylate, carboxyethyl acrylate, dimethylaminoethyl methacrylate, and diethylaminoethyl methacrylate.

The copolymer can have a weight average molecular weight in a range of from about 5,000 to about 2,500,000 Daltons, or from about 8,000 to about 2,000,000, or from about 100,000 to about 1,500,000 Daltons, or from about 300,000 to about 1,000,000 Daltons.

The aqueous binder composition can further comprise at least one anionic polymer. Examples of the anionic polymer can include, but are not limited to, carboxymethyl cellulose; carboxymethyl hydroxyethyl cellulose; a guar derivative including carboxyalkyl guar such as carboxymethyl guar and carboxyalkyl hydroxypropyl guar such as carboxymethyl hydroxyethyl guar and carboxymethyl hydroxypropyl guar; polyacrylic acid; poly(acrylamide-2-methylpropane sulfonic acid); a copolymer derived from acrylamide-2-methylpropane with acrylamide, acrylonitrile, acrylic acid or acrylate; alginate; chitosan; carrageenan; and a tetrapolymer derived from 2-acrylamido-2-methyl-1-propanesulfonic acid (AMPS), acrylic acid, acrylamide and 3-alloyloxypropryl sulfonic acid.

The present disclosure also relates to an aqueous slurry composition comprising an aqueous binder composition, an electrode active material, and a conductive agent. In one non-limiting embodiment, the aqueous slurry composition can further comprise a dispersant and an aqueous solvent. The aqueous binder compositions are the same as those described previously.

The electrode active material can be an anode active material. The anode active material can be silicon containing electrode active material, or a metal containing material such as Sn or Ti. In one non-limiting embodiment, the silicon containing material can be silicon, silicon-graphene, silicon-carbon nanotubes, silicon-based alloys, and combinations thereof.

The anode active material can also comprise silicon oxide or carbon coated silicon oxide. The silicon oxide can, for example but without limitation, be represented by the formula $SiO_x$, wherein $1 \le x < 2$. The carbon coated silicon oxide can be represented by the formula $SiO_xC$, wherein $1 \le x < 2$ and further wherein the weight ratio of carbon to silicon oxide can be at least 50:50, or in a range of from about 70:30 to about 99:1, or from about 80:10 to about 95:5, or from about 90:10 to about 95:5.

In one non-limiting embodiment, the anode active material can comprise a silicon-graphene composition. For example, the XG-SIG™ silicon-graphene nano-composite material available from XG Sciences, Inc. (Lansing, MI) can be used in the present disclosure. In another non-limiting embodiment, the anode active material can comprise a silicon alloy, for example but without limitation, silicon titanium nickel alloy (STN), and/or a mixture of a silicon alloy and graphite. More specifically, the anode active material can comprise silicon alloy and graphite mixture, wherein the silicon alloy is present in a range of from about 30 to 50 wt %, or from about 35 to about 45 wt %, or from about 37.5 to about 42.5 wt %, and wherein the graphite is present in a range from about 50 to about 70 wt %, or from about 55 to about 65 wt % or from about 57.5 to about 62.5 wt %.

The electrode active material can be a cathode active material. The cathode active material can be any material comprising, consisting of, or consisting essentially of lithium-containing transition metal oxides. The cathode active material, in one non-limiting embodiment, can be selected from the group consisting of lithium iron phosphate ($LiFePO_4$), lithium cobalt oxide ($LiCoO_2$), lithium nickel oxide ($LiNiO_2$), lithium nickel cobalt aluminum oxide ($LiNiCoAlO_2$), lithium nickel manganese cobalt oxide ($LiNiMnCoO_2$), lithium manganese oxide ($LiMnO_4$), and combinations thereof.

In another non-limiting embodiment, the cathode active materials can be doped by an element, which can include, but are not limited to, boron, magnesium, aluminum, titanium, chromium, iron, zirconium, copper, zinc, gallium, yttrium, fluoride, and their combinations. In addition, a thin coating material can also be applied onto the cathode active material surface, which can include, but are not limited to, ZnO, $In_2O_3$, $SnO_2$, $Y_2O_3$, $La_2O_3$, $Li_2TiO_3$, $CaTiO_3$, $BaTiO_3$, SrO, and combinations thereof.

The conductive agent can be selected from a carbon-based conductive agent, a graphite-based conductive agent, a metal-based conductive agent and a metallic compound-based conductive agent, but it is not limited thereto.

The carbon-based conductive agent can be selected from Super P carbon black (commercially available from Imerys Graphite & Carbon Switzerland SA), ketchen black, denka black, acetylene black, carbon black, thermal black, or channel black. The graphite-based conductive agent can be TIMREX® graphite grades such as KS6 or KS15, commercially available from Imerys Graphite & Carbon Switzerland SA. The carbon nano-tube (CNT), can be LB 100 or LB 200 series, commercial available from Cnano Technology Limited, San Jose, CA The metal or metallic compound-based conductive agent can be selected from tin, tin oxide or tin phosphate ($SnPO_4$). The amounts of the conductive agent in the coating layer can be in a range of 0.1 to 20 wt %, or in a range of 0.5 to 10 wt %, or in a range of 1 to 5 wt % based on the total weight of the slurry composition.

The dispersant can be selected from a polyacrylate-based resin; polyethylene oxide; a block polymer of $(EO)_l(PO)_m$ $(EO)_l$ where EO indicates ethylene oxide, PO indicates propylene oxide, and l and m are in the numerical range of 1 to 500; polyvinyl chloride (PVC); polyvinylpyrrolidone (PVP); polyacrylic acid (PAA); an acrylonitrile/butadiene/ styrene (ABS) polymer; an acrylonitrile/styrene/acrylester (ASA) polymer; a mixture of the ABS polymer and propylene carbonate; a styrene/acrylonitrile (SAN) copolymer; or a methylmethacrylate/acrylonitrile/butadiene/styrene (MABS) polymer. The amount of the dispersant can be varied in a range of 0.1 to 20 wt % of the conductive agent. The conductive agent can uniformly be dispersed in the presence of the dispersant.

The aqueous solvent can be water and/or water-solvent. The solvent is totally dissolved in water. The slurries of the present disclosure have a good stability, wherein the slurries can visibly stay in solution for at least 24 hours, or for at least 3 days, or for at least 5 days. In one embodiment, the above-described aqueous slurry composition has a Brookfield viscosity in a range of from about 1,000 mPa·s to about 15,000 mPa·s, or from about 4000 mPa·s to about 11,000 mPa·s, or from about 5500 mPa·s to about 8500 mPa·s at a shear rate in a range of from about 1 s$^{-1}$ to about 40 s$^{-1}$ at 25° C.

The present disclosure encompasses an electrode comprising, consisting of, or consisting essentially of the aqueous slurry composition as described above, and a current collector. The aqueous slurry composition is coated on the surface of the current collector to form a film. The electrode active material is present in the film in a range of from about 70 to about 99 wt %, or from about 80 to about 95 wt %, or from about 85 to about 95 wt %; the conductive carbon is present in a range of from about 0.5 to about 15 wt %, or from about 2.5 to about 10 wt %, or form about 1 to about 4 wt %; and the binder composition is present in the film in a range of from about 0.5 to about 15 wt %, or from about 2.5 to about 10 wt %, or from about 4 to about 11 wt %.

The current collector can comprise any material that acts as an electrical conductor for either the anode or cathode active materials. The current collector can be made of materials selected from the group consisting of aluminum, carbon, copper, stainless steel, nickel, zinc, silver, and combinations thereof. In one non-limiting embodiment, the current collector for the anode comprises copper foil. In another non-limiting embodiment, the current collector for the cathode comprises aluminum foil.

Additionally, the present disclosure also encompasses a method of making an electrode for a lithium ion battery comprising the steps of (1) combining an aqueous binder composition, an electrode active material, a conductive agent, an optional dispersant and an aqueous solvent to form an aqueous slurry composition; (2) applying the aqueous slurry composition to a current collector to form a coated current collector comprising a slurry layer on the current collector; and (3) drying the slurry layer on the coated current collector to form a film on the current collector, wherein the film and the current collector comprise the electrode. The aqueous binder composition, the electrode active material, the conductive agent, the dispersant and the aqueous solvent are the same as those described previously.

In one non-limiting embodiment, the step (3) of drying the slurry on the current collector comprises heating the coated current collector at a temperature in a range of from about 80 to about 175° C., or from 100 to about 150° C. for a time in a range of from about 0.5 hour to about 3 hours, or from about 1 hour to about 2 hours.

The electrode dry film has a thickness in a range of from about 20 μm to about 150 μm, or from about 30 μm to about 100 μm, or from about 30 μm to about 70 μm.

The above-described film can be bound to a surface of the above-described current collector to form a bond. In one embodiment, the adhesive strength of the bond is at least 0.5 gf/mm, or at least 0.7 gf/mm, or at least 1.0 gf/mm as determined by the 90 Degree Peel Adhesion Test, which will be described below.

EXAMPLES

Preparation of Copolymer Derived from Acrylamido Methyl Propane Sulfuric Acid-Acrylamide (AMPS-AM):

The polymerization was carried out in a 1 L four-necked glass reactor, equipped with a reflex condenser, a mechanical stirrer and a nitrogen inlet gas. 137.2 g AMPS sodium salt solution (15 mole %), 120 g AM (85 mole %) and 350 g DI water were mixed to form a mixture under nitrogen. The mixture was added into the reactor and was sparged with nitrogen for about 15 minutes. Vazo-50 solution was prepared by dissolving 0.2 wt % of Vazo-50 based on the total weight of the monomers into a water/ethanol (1:1 weight ratio). The reactor was heated to about 55-60° C. The polymerization started by adding the Vazo-50 solution and lasted for about 6 hours. The Vazo-50 solution was added into the reactor at 1 h, 2 h, 3 h, 4 h and 6 h. The temperature was maintained at about 50-55° C. during the six hours period. After that, the temperature of the reactor was increased to about 65-70° C. and the resultant viscous material was stirred for about 10-16 hours. Finally, the contents of the reactor were discharged and dried under vacuum of 3-5 mm Hg at about 65° C. for about 5-7 hours.

The solids obtained were ground into powders for use as an anionic polymer (AMPS-AM) described below.

Silicon Slurry Preparations for Viscosity and Adhesion Tests

Slurries were prepared using the ingredients listed in Table 1. For the anode active material listed in Table 1, 650 mAh/g SiO represented a powder mixture of graphite and silicon oxide, which was commercially available from BTR Energy Materials Co., LTD (Shenzhen, China). 680 mAh/g SiO represented a powder mixture of graphite (commercially available from BTR Energy Materials Co., LTD) and SiO$_x$ (commercially available from Osaka Titanium Technologies Co., Ltd. (Amagasaki, Hyogo Prefecture, Japan) having an initial capacity of about 350 mAh/g in a weight ratio of 75:25 (graphite to silicon oxide). The conductive carbon, C-NERGY™ Super C65 (commercially available from Imerys Graphite & Carbon, Bodio, Switzerland), was used a conductive agent listed in Table 1. The contents of the components are presented based on the total weights of the slurries.

TABLE 1

| | Cationic Copolymer (wt %) | Anionic Polymer (wt %) | Anode Active Material (wt %) | Conductive Agent (wt %) | Water (wt %) |
|---|---|---|---|---|---|
| Sample | | | | | |
| 1 | N-Hance ™ SP-100 (0.7) | CMC 7LF (2.1) | 650 mAh/g SiO (39.8) | 1.8 | 55.6 |
| 2 | N-Hance ™ SP-100 (0.3) | CMC 7HO (1.0) | 650 mAh/g SiO (20.0) | 0.9 | 77.7 |
| 3 | N-DurHance ™ AA200 | CMC 7LF (1.2) | 650 mAh/g SiO (36.7) | 1.6 | 59.2 |
| 4 | N-Hance ™ SP-100 (0.4) | CMC 7MF (1.2) | 650 mAh/g SiO (20.0) | 1.0 | 74.5 |
| 5 | N-Hance ™ SP-100 (0.6) | CMC 7LF (1.8) | 650 mAh/g SiO (42.1) | 2.3 | 53.2 |
| 6 | N-Hance ™ SP-100 (0.2) | CMC 7LF (1.8) | 650 mAh/g SiO (35.4) | 2.0 | 60.7 |
| 7 | Prasetol ™ 644BC (0.7) | CMC 7LF (2.0) | 650 mAh/g SiO (40.1) | 1.8 | 55.4 |
| 8 | Prasetol ™ 611BC (0.7) | CMC 7LF (2.0) | 650 mAh/g SiO (40.1) | 1.8 | 55.4 |
| 9 | Prasetol ™ 610BC (0.7) | CMC 7LF (2.0) | 650 mAh/g SiO (38.1) | 1.7 | 57.6 |
| 10 | Prasetol ™ 852BC (0.7) | CMC 7LF (2.1) | 650 mAh/g SiO (40.4) | 1.8 | 55.0 |
| 11 | N-Hance ™ 4572 (1.6) | CMC 7LF (1-6) | 650 mAh/g SiO (38.3) | 1.1 | 57.4 |
| 12 | N-Hance ™ 4572 (0.5) | AMPS-AM copolymer (2.9) | 650 mAh/g SiO (35.7) | 1.6 | 60.3 |
| 13 | N-Hance ™ SP-100 (0.7) | AMPS-AM copolymer (2.2) | 650 mAh/g SiO (33.2) | 1.4 | 63.0 |
| 14 | N-Hance ™ 3215 (0.5) | CMC 7LF (1.9) | 680 mAh/g SiO (35.6) | 1.6 | 60.4 |
| 15 | XxtraDura ™FLA 3766 | CMC 7LF (2.1) | 680 mAh/g SiO (35.0) | 1.6 | 61.1 |
| 16* | — | CMC MAC 350 (0.9) | 650 mAh/g SiO (33.5) | 1.5 | 62.8 |

N-Hance ™ SP100: Acrylamidopropyl Trimonium Chloride/Acrylamide Copolymer, commercially available from Ashland LLC.

N-DurHance ™ AA200: A highly charged homopolymer of (3-acrylamidopropyl) trimethyl ammonium chloride, commercially available from Ashland LLC.

Prasetol ™ 644BC: Acrylamidopropyl Trimonium Chloride/Acrylamide Copolymer, commercially available from Solenis LLC.

Prasetol ™ 611BC: Acrylamidopropyl Trimonium Chloride/Acrylamide Copolymer, commercially available from Solenis LLC.

Prasetol ™ 610BC: Acrylamidopropyl Trimonium Chloride/Acrylamide Copolymer, commercially available from Solenis LLC.

Prasetol ™ 852BC: Acrylamidopropyl Trimonium Chloride/Acrylamide Copolymer, commercially available from Solenis LLC.

N-Hance ™ 4572: Guar and Guar derivatives, commercially available from Ashland LLC.

N-Hance ™ 3215: Guar Hydroxypropryltrimonium Chloride, commercially available from Ashland LLC.

XxtraDura ™ FLA 3766: A fluid loss additive, commercially available from Ashland LLC.

CMC 7LF: Aquaion ™ sodium carboxymethylcellulose, commercially available from Ashland LLC.

CMC 7HO: Blanose ™ sodium carboxymethylcellulose, commercially available from Ashland LLC.

CMC MAC 350: Sunrose ® carboxymethylcellulose, commercially available from Nippon Paper Group, Inc. Japan.

*Containing 1.3 wt % of Zeon ® BM-480B: Styrene butadiene latex, commercially available from Zeon Corporation, Tokyo, Japan.

Slurry Rheology Measurements

Viscosities of the slurry compositions listed in Table 1 were measured with a Brookfield® viscometer from Brookfield Engineering Laboratories, Inc. (Middleboro, MA) at 3 rpm and 30 rpm with spindle 4. The viscosities were measured in a 17 mL vial immediately after mixing and after 3 days of the mixing. The results were listed in Table 2. The slurry stability is also shown in Table 2.

TABLE 2

| | Viscosities and slurry stability | | |
|---|---|---|---|
| Sample # | Viscosity after mixing (3 RPM/30 RPM) (mPa · s) | Viscosity after 3 days (3 RPM/30 RPM) (mPa · s) | Stability (days) |
| 1 | 15000/6090 | 13890/5110 | >5 |
| 2 | 28830/7410 | 26660/6970 | >5 |
| 3 | 40800/7200 | 39450/5980 | >3 |
| 4 | 17770/4290 | 14270/3430 | >3 |
| 5 | 7770/3600 | 11290/5470 | >3 |
| 6 | 23110/6570 | 30060/7990 | >5 |
| 7 | 8110/4090 | 8320/4080 | >5 |
| 8 | 7460/4550 | 7900/6100 | >3 |
| 9 | 9350/5900 | 9620/6000 | >5 |
| 10 | 8370/4080 | 8720/4110 | >5 |
| 11 | 16990/5550 | 19800/7430 | >3 |
| 12 | 28200/6140 | 61000/12230 | <1 |
| 13 | 31200/8840 | 81400/13640 | <1 |
| 14 | 14797/4679 | 55788/8978 | >1 |
| 15 | 27954/5759 | 50589/8638 | >1 |
| 16 | 57588/9758 | 58987/9718 | >5 |

Adhesion Measurements

Adhesion measurements were carried out by performing a 90-degree peel test on electrodes formed by coating and drying the slurry compositions on copper current collectors. The 90-degree peel test was conducted by using a peel test fixture from Instron® (Norwood, MA), wherein the electrodes were tested having loading of 2.5-3.5 mg/cm$^2$ and loading of 4.0-5.0 mg/cm$^2$. The individual electrode samples were mounted on a stainless steel plate with 3M® double sided scotch tape from 3M Corporation (St. Paul, MN) after which the film, which was also stuck to the scotch tape, was peeled off at a rate of 1 foot/min. by the Instron® Instrument during which the Instron® Instrument measured the force necessary to peel the film off the current collector. The results are listed in Table 3.

TABLE 3

| Sample | Adhesion (gf/mm) | |
|---|---|---|
| # | Loading at 2.5-3.5 mg/cm$^2$ | Loading at 4.0-5.0 mg/cm$^2$ |
| 1 | 1.279 | 0.99 |
| 2 | 1.90 | 0.73 |
| 3 | 1.16 | 0.75 |
| 4 | 3.15 | 1.61 |
| 5 | 1.59 | 1.28 |
| 6 | 2.53 | 1.74 |
| 7 | 2.06 | 0.85 |
| 8 | 3.47 | 1.79 |
| 9 | 2.14 | 1.37 |
| 10 | 1.81 | 1.89 |
| 11 | 1.83 | — |
| 12 | 3.75 | — |
| 13 | 3.75 | 2.85 |
| 14 | 1.49 | — |
| 15 | 2.04 | — |
| 16 | 1.69 | — |

What is claimed is:

1. An aqueous binder composition for an electrode of a lithium ion battery comprising:

a cationic copolymer derived from at least one cationic monomer selected from the group consisting of acrylamidopropyltrimethylammonium chloride (APTAC), methacrylamidopropyltrimethylammonium chloride (MAPTAC), acryloyloxyethyltrimethylammonium chloride (AETAC), methacryloyloxyethyltrimethylammonium chloride (MAETAC), N-[2-(acryloyloxy)ethyl]-N-benzyldimethylammonium chloride, acryloyloxyethyltrimethylammonium chloride, and 3-(methacryloylamino) propyl-lauryl-dimethylammonium chloride (MAPLDMAC);

at least one nonionic monomer selected from the group consisting of acrylamide (AM), dimethylacrylamide, diethylacrylamide, hydroxyethyl acrylamide, dimethylaminopropyl acrylamide, dimethylaminopropyl methacrylamide, vinyl acetate (VA), vinylformamide, acrylonitrile (AN), acrylate, ethylhexyl acrylate, carboxyethyl acrylate, dimethylaminoethyl methacrylate, and diethylaminoethyl methacrylate;

and an anionic polymer selected from the group consisting of a guar derivative, poly(acrylamide-2-methylpropane sulfonic acid, a copolymer derived from acrylamide-2-methylpropane sulfonic acid with acrylic acid or acrylate, carrageenan, and a tetrapolymer derived from acrylamidomethylpropyl sulfonate (AMPS), acrylic acid, acrylamide and 3-allyloxy-2-hydroxypropyl sulfonic acid.

2. The aqueous binder composition of claim 1, wherein the cationic copolymer has a weight average molecular weight is in a range of from 5,000 to 1,000,000 Daltons.

3. An aqueous slurry composition comprising:

an aqueous binder composition of claim 1, an electrode active material, a conductive agent, a dispersant, and an aqueous solvent.

4. The aqueous slurry composition of claim 3, wherein the electrode active material comprises one or more chemical elements selected from the group consisting of Si, Sn and Ti.

5. The aqueous slurry composition of claim 4, wherein the Si containing electrode active material is selected from the group consisting of SiO$_x$/graphite, SiC, SiO$_x$ wherein 1≤x<2, SiO$_x$C wherein 1≤x<2, Si-graphene, Si-based alloys, and combinations thereof.

6. The aqueous slurry composition of claim 3, wherein the conductive agent is selected from a group consisting of a carbon-based conductive agent, a graphite-based conductive agent, a metal-based conductive agent and a metallic compound-based conductive agent.

7. The aqueous slurry composition of claim 3, wherein the aqueous binder composition is present in a range of from 0.25 to 12 wt % by dry weight basis based on the total weight of the aqueous slurry composition.

8. The aqueous slurry composition of claim 3, wherein the aqueous slurry composition has a Brookfield viscosity in a range of from 1,000 to 15,000 mPa·s at a shear rate in a range of from 1 to 40 s$^{-1}$ and 25° C.

9. An electrode for a lithium ion battery comprising:
an aqueous slurry composition of claim 3; and
a current collector.

10. The electrode of claim 9, wherein the aqueous slurry composition is coated on the current collector to form a film.

11. The electrode of claim 9, wherein the current collector comprises a metal selected from the group consisting of aluminum, copper, and combinations thereof.

12. The electrode of claim 10, wherein the film has a thickness in a range of from 10 μm to 150 μm.

13. The electrode of claim 9, wherein the electrode is an anode.

14. The electrode of claim 9, wherein a surface of the film and a surface of the current collector are adhered to each other with an adhesive strength of at least 0.3 gf/mm as determined by 90 Degree Peel Adhesion Test.

15. A lithium ion battery comprising an anode, a cathode and an electrolyte, wherein the anode is the electrode of claim 9.

16. A method of making an electrode for a lithium ion battery comprising the steps of:
combining the aqueous binder composition of claim 1, an electrode active material, a conductive agent, a dispersant and an aqueous solvent to form an aqueous slurry composition;
applying the aqueous slurry composition to a current collector to form a coated current collector comprising a slurry layer on the current collector; and
drying the slurry layer on the coated current collector to form a film on the current collector, wherein the electrode comprises the film and the current collector.

17. The method of claim 16, wherein the aqueous binder composition is present in the aqueous slurry composition in a range of from 0.25% to 12% by dry weight basis and the electrode active material is present in the aqueous slurry composition in a range of from 80% to 99.5% by dry weight basis based on the total weight of the aqueous slurry composition.

\*    \*    \*    \*    \*